United States Patent
Feuillade et al.

(10) Patent No.: US 12,138,872 B2
(45) Date of Patent: Nov. 12, 2024

(54) DETERMINING METHOD FOR AN OPHTHALMIC LENS WITH TARGETED TRANSMISSION SPECTRUM

(71) Applicant: Essilor International, Charenton-le-Pont (FR)

(72) Inventors: Mathieu Feuillade, Charenton-le-Pont (FR); Pierre Fromentin, Bangkok (TH); Gregory Hervieu, Charenton-le-Pont (FR); David Montoya, Charenton-le-Pont (FR); Aref Jallouli, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 40 days.

(21) Appl. No.: 16/982,957

(22) PCT Filed: Jun. 3, 2019

(86) PCT No.: PCT/EP2019/064377
§ 371 (c)(1),
(2) Date: Sep. 21, 2020

(87) PCT Pub. No.: WO2019/233960
PCT Pub. Date: Dec. 12, 2019

(65) Prior Publication Data
US 2021/0016529 A1    Jan. 21, 2021

(30) Foreign Application Priority Data
Jun. 8, 2018 (EP) .................... 18305702

(51) Int. Cl.
*B29C 64/393* (2017.01)
*B29C 64/129* (2017.01)
(Continued)

(52) U.S. Cl.
CPC ...... *B29D 11/00442* (2013.01); *B29C 64/129* (2017.08); *B29C 64/393* (2017.08);
(Continued)

(58) Field of Classification Search
CPC ........ B29D 11/00307; B29D 11/00442; B29D 11/00144; B29D 11/00923; B24B 17/00;
(Continued)

(56) References Cited

U.S. PATENT DOCUMENTS 6,159,296 A   12/2000 Aoyama et al.
6,730,244 B1 * 5/2004 Lipscomb ........ B29D 11/00442
                                              522/182
(Continued)

FOREIGN PATENT DOCUMENTS

DE   10 2009 004 377    7/2010
EP       1 442 870       8/2004
(Continued)

OTHER PUBLICATIONS

International Search Report for PCT/EP2019/064377 dated Aug. 9, 2019, 4 pages.
(Continued)

*Primary Examiner* — Nahida Sultana
(74) *Attorney, Agent, or Firm* — NIXON & VANDERHYE

(57) ABSTRACT

Disclosed is a method of manufacturing an ophthalmic lens having at least one optical function, including the determination of a transmission spectrum in a wavelength range from 280 to 2000 nm, the determination of a matrix including at least two compounds absorbing light having a wavelength from 280 to 2000 nm, with regard to the determined transmission spectrum, and additively manufacturing the matrix.

19 Claims, 2 Drawing Sheets

(51) Int. Cl.
  *B29D 11/00* (2006.01)
  *B33Y 10/00* (2015.01)
  *B33Y 50/02* (2015.01)
  *B33Y 80/00* (2015.01)
  *G02C 7/10* (2006.01)

(52) U.S. Cl.
  CPC ........ *B29D 11/00653* (2013.01); *B33Y 10/00* (2014.12); *B33Y 50/02* (2014.12); *B33Y 80/00* (2014.12); *G02C 7/10* (2013.01)

(58) Field of Classification Search
  CPC ..... B29C 64/393; B29C 64/129; B29C 64/25; B29C 64/255; B29C 64/264; B29C 64/268; B29C 64/277; B29C 64/282; B29C 64/286; B29C 64/291; B29C 64/124; B29C 64/112; B29C 64/336
  See application file for complete search history.

(56) References Cited

U.S. PATENT DOCUMENTS

| | | | |
|---|---|---|---|
| 6,936,197 B1 * | 8/2005 | Wires | B29C 35/0888 249/117 |
| 2004/0008319 A1 | 1/2004 | Lai et al. | |
| 2005/0046957 A1 * | 3/2005 | Lai | B29D 11/00355 359/652 |
| 2016/0161761 A1 * | 6/2016 | Quere | G02C 7/027 427/164 |
| 2016/0167299 A1 * | 6/2016 | Jallouli | B29C 64/386 264/2.6 |
| 2016/0311184 A1 * | 10/2016 | Gourraud | B29C 64/40 |
| 2019/0235275 A1 * | 8/2019 | Glöge | B29D 11/00009 |

FOREIGN PATENT DOCUMENTS

| | | | |
|---|---|---|---|
| EP | 3 311 993 | 4/2018 | |
| EP | 3311993 B1 * | 3/2019 | ........... B29C 64/393 |
| FR | 3 008 196 | 1/2015 | |
| JP | 2005532598 A | 10/2005 | |
| JP | 2008-180849 A | 8/2008 | |
| JP | 2017-502334 A | 1/2017 | |
| KR | 20160015263 A | 2/2016 | |
| WO | 2004/070452 A2 | 8/2004 | |
| WO | 2014/195654 | 12/2014 | |
| WO | 2018/045040 A1 | 3/2018 | |

OTHER PUBLICATIONS

Written Opinion of the ISA for PCT/EP2019/064377 dated Aug. 9, 2019, 6 pages.
Office Action issued in Japanese Patent Application No. 2020-561019 dated Dec. 5, 2022.
Notice of Preliminary Rejection, issued in Korean Patent Application No. 10-2022-7044964 dated Oct. 9, 2023.

* cited by examiner

DETERMINING METHOD FOR AN OPHTHALMIC LENS WITH TARGETED TRANSMISSION SPECTRUM

CROSS-REFERENCE TO RELATED APPLICATIONS

This application is the U.S. national phase of International Application No. PCT/EP2019/064377 filed Jun. 3, 2019 which designated the U.S. and claims priority to European Application No. 18305702.5 filed Jun. 8, 2018, the entire contents of each of which are hereby incorporated by reference.

BACKGROUND OF THE INVENTION

Field of the Invention

The invention relates to the field of the manufacture of ophthalmic lenses having at least one filtering function obtained with regard to a determined transmission spectrum.

Description of the Related Art

Methods for manufacturing ophthalmic lenses with pre-determined filtering function are known in the art. As an example, U.S. Pat. No. 6,159,296 A describes a coloration process for depositing dyes on a lens surface.

However, main technical problem is that today, it is difficult to propose ophthalmic lenses having a broad range of available filtering characteristics. Indeed, known methods using dyes/pigment in the substrate or a coating having dyes/pigment or imbibition, as described in U.S. Pat. No. 6,159,296 A, do not permit high flexibility in the filtering characteristics provided to the lens.

Furthermore, some molecules used for selective absorption, notably with regard to a determined transmission spectrum, are difficult to introduce in lens matrix. Indeed, chemical or physical incompatibility occurs through bulk mixing between these specific molecules and monomer, initiator, or other additives present in the formulation. Consequently, desired transmission spectrum of the lens cannot be achieved or complex methods, as encapsulation, must be used to overcome said incompatibility issue.

SUMMARY OF THE INVENTION

A problem that the invention aims to solve is thus to provide an improved method allowing to manufacture an ophthalmic lens with broad range filtering characteristics obtained depending on a determined transmission spectrum.

To solve this problem, the invention provides a method of manufacturing an ophthalmic lens having at least one optical function, comprising:
- a step of determining a transmission spectrum in a wavelength range from 280 to 2000 nm,
- a step of determining a matrix comprising at least two compounds absorbing light having a wavelength from 280 to 2000 nm, with regard to the determined transmission spectrum,
- a step of additively manufacturing said matrix by depositing a plurality of predetermined volume elements of said compounds on a predetermined build support.

Additive manufacturing allows to compose the ophthalmic lens as a matrix made of different layers and/or voxels specifically chosen to obtain a desired transmission spectrum. Indeed, additive manufacturing allows to select the position, characteristics and the nature of the compounds forming the matrix so that nature and spatial features of the matrix may be precisely determined.

A precise protection of the wearer may thus be obtained against specific wavelengths keeping the other wavelengths transmitted. Wearer's sight may be improved through specific wavelength filtration, e.g. contrast.

Consequently, this manufacturing method allows a great variety in the ophthalmic lens structure so that the provided filtering function can closely fit the desired transmission spectrum of the ophthalmic lens. It thus provides an accurate manufacturing method allowing many lens customization possibilities.

According to an embodiment of the manufacturing method, said transmission spectrum is determined in a wavelength range from 280 to 1400 nm and said matrix comprises at least two compounds absorbing light having a wavelength from 280 to 1400 nm, with regard to the determined transmission spectrum.

According to an embodiment of the manufacturing method, said matrix comprises at least one among a plurality of layers and a plurality of voxels.

According to an embodiment of the manufacturing method, the matrix defines a three-dimensional axis system comprising:
- a first and a second surface axes defining a surface of the build support; and
- a thickness axis defining the thickness of the matrix, wherein said step of determining the matrix comprises a step of selectively determining the position of each volume element in the matrix depending on the first and second surface axes and the thickness axis.

According to an embodiment of the manufacturing method, the thickness axis is perpendicular to a surface of the build support onto which said compounds are deposited.

According to an embodiment of the manufacturing method, volume elements are distributed in the matrix so that the amount of at least one of said at least two compounds varies in the matrix along at least one of the first and second surface axes and the thickness axis.

According to an embodiment of the manufacturing method, said matrix is determined to have variable transmission level along first and second surface axes.

According to an embodiment of the manufacturing method, said at least two compounds comprise at least one dye.

According to an embodiment of the manufacturing method, said at least two compounds comprises compounds which are chemically or physically incompatible with each other.

According to an embodiment of the manufacturing method, the matrix is determined such that a barrier is formed between two consecutive layers or voxels comprising incompatible compounds.

According to an embodiment of the manufacturing method, the barrier is formed by:
- at least one transitional layer of compound separating two consecutive layers comprising incompatible compounds, or
- at least one transitional voxel disposed between two consecutive voxels comprising incompatible compounds.

According to an embodiment of the manufacturing method, the build support is an optical substrate.

According to an embodiment of the manufacturing method, said matrix has a dimension along said thickness axis which is lower than 50 µm.

According to an embodiment of the manufacturing method, it further comprises a step of assembling said matrix to an optical substrate to obtain the ophthalmic lens.

According to an embodiment of the manufacturing method, the additively manufacturing step to manufacture said matrix is one among polymer jetting and stereolithography.

According to an embodiment of the manufacturing method, it further comprises a step of polishing the matrix, wherein said matrix is determined to be oversized along the thickness axis and/or to comprise a peripheral layer having a transmission being higher than the transmission of a matrix area located between said peripheral layer and the build support.

According to an embodiment of the manufacturing method, the steps of determining said transmission spectrum and said matrix form a computer implemented method, the step of determining said matrix comprising:
  a step of providing a data base comprising a plurality of compounds,
  a step of allocating a label to each compound in the data base,
  a step of selecting said at least two compounds in the data base depending on said allocated labels and the position of volume elements of said at least compounds so that said matrix has the determined transmission spectrum.

According to an embodiment of the manufacturing method, the step of determining the transmission is performed depending on factors measured onto or identified by a wearer of the ophthalmic lens.

According to an embodiment of the manufacturing method, the transmission spectrum is a specific spectrum determined among at least one the following: blue spectrum, color-blind spectrum, convergence correcting spectrum and glaze correcting spectrum.

The invention also provides an ophthalmic lens having at least one optical function, the ophthalmic lens being obtained by the manufacturing method as described above, the ophthalmic lens comprising:
  an optical substrate;
  a matrix onto a surface of the optical substrate, said matrix providing a spectrum transmission in a wavelength range from 280 to 2000 nm to the ophthalmic lens, said matrix comprising at least two compounds absorbing light having a wavelength from 280 to 2000 nm,
  wherein said matrix is obtained by additive manufacturing by depositing a plurality of predetermined volume elements of said compounds on a predetermined build support.

BRIEF DESCRIPTION OF THE DRAWINGS

The invention is described in more detail below by way of the figures that show several preferred embodiments of the invention.

DESCRIPTION OF THE PREFERRED EMBODIMENTS

Figure 1:
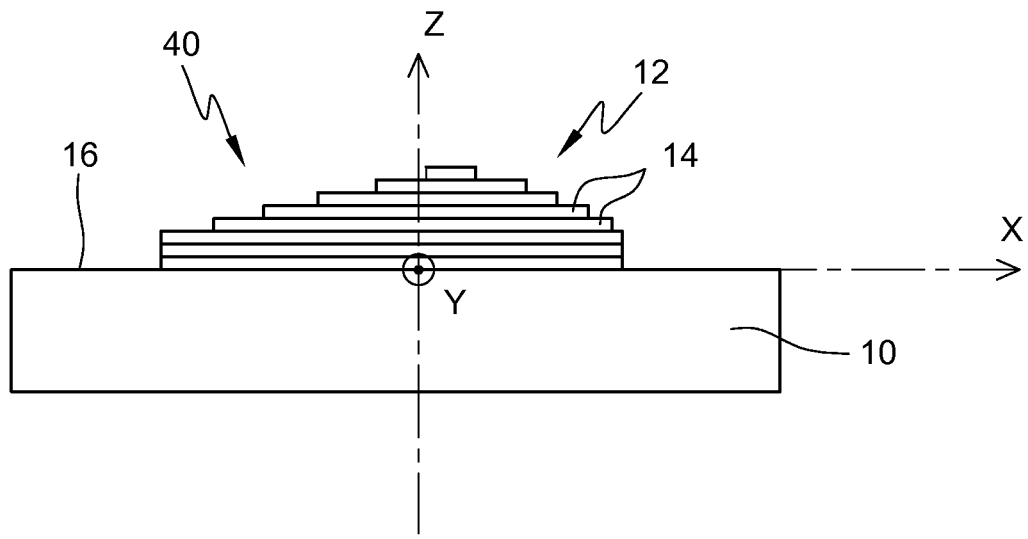
FIG. 1 schematically shows an ophthalmic lens comprising a matrix obtained by the deposition of predetermined volumes on a build support.

A method of manufacturing an ophthalmic lens having at least one filtering function is proposed. An ophthalmic lens obtained by this manufacturing method is also proposed.

It will be recalled that the filtering function of an ophthalmic lens, of a system or of an optical element means the ability of this lens or of this system or of this element to selectively absorb light of certain wavelengths or colors passing through the lens, the system or the optical element concerned. The filtering function is to be dissociated from a power optical function which defines any modification in the propagation and transmission of an optical beam through the lens. More specifically, in the field of ophthalmics, the power optical function is defined as the distribution of wearer power and astigmatism characteristics and of higher-order aberrations associated with the lens, with the system or with the optical element for all the directions of gaze of a wearer of this lens, of this system or of this element. Here, the manufactured ophthalmic lens comprises at least one filtering function and may additionally comprise at least one power optical function.

Said proposed manufacturing method comprises a step of determining a transmission spectrum in a wavelength range from 280 to 2000 nm. In other words, a specific wavelength range or plurality of specific wavelength ranges is selectively identified between 280 and 2000 nm. The expected transmission spectrum may be homogeneous in the ophthalmic lens or have spatial variations, i.e. that the spectrum varies along the ophthalmic lens. The transmission spectrum is expressed in $T\%(\lambda)$. For example, it is thus possible to have a plurality of areas of the ophthalmic lens with different filtering characteristics. Alternatively, the transmission spectrum may be selectively determined in either the ultraviolet spectrum with a wavelength between 280 and 380 nm, or the visible spectrum with a wavelength between 380 and 780 nm or the near infrared spectrum (also called IR-A) with a wavelength between 780 nm and 1400 nm or the infrared spectrum with a wavelength between 780 nm and 2000 nm or a combination thereof. In particular, the transmission spectrum may be determined over the spectrum ranging from 280 nm to 1400 nm.

Said transmission spectrum is preferably a specific spectrum determined among at least one the following:
  selective spectrum filtering a small range of wavelength: blue spectrum associated with displays and digital use, blue spectrum associated with chronobiological disorder, yellow filter associated with glare or cataract, specific filters associated with laser emission,
  color enhancing filters especially for color-blind people. These filters modify red/green balance or green/blue balance, while adapting the overall transmission of the filter.
  convergence correcting spectrum; and
  glaze correcting spectrum.

Said step of determining the transmission spectrum is preferably performed depending on factors measured onto or identified by a wearer of the ophthalmic lens. These factors include age, light sensitivity, frequent activities (indoor/outdoor, computer use).

Then, the manufacturing method comprises a step of determining a matrix comprising at least two compounds absorbing light having a wavelength from 280 to 2000 nm, with regard to the determined transmission spectrum. In other words, at least two compounds absorbing light in the range between 280-2000 nm are chosen to reach the targeted transmission spectrum. In particular, when transmission spectrum is determined over the spectrum ranging from 280 nm to 1400 nm, the manufacturing method comprises a step of determining a matrix comprising at least two compounds absorbing light having a wavelength from 280 to 1400 nm. Said targeted transmission spectrum may be preferably reached by a linear combination of each compound. These compounds may be a transparent material, e.g. polymer, in which a Light Management Additives (LMA) is incorporated or a polymer without any incorporated LMA wherein this polymer already contains filtering characteristics. In the following, Light Management Additives may be dyes or pigments, with absorbing characteristics in any part of the spectrum from 280 nm up to 2000 nm. In particular, LMA include photochromic compounds, dichroic compounds, fluorescent compounds.

Said at least two compounds may be two polymers with different absorption spectra, two similar polymers including one tinted with a LMA, a polymer and a LMA as well as at least two LMAs. In some embodiments, said at least two compounds comprise at least one dye.

Besides, the matrix may be not uniform over its whole surface. A specific filter may be implemented on a progressive ophthalmic lens depending on a far vision area and a near vision area. In this case, it may be preferred to avoid glare in far vision area and improve contrast in near vision area.

Once the matrix is determined, a step of additively manufacturing said matrix is performed by depositing a plurality of predetermined volume elements of said compounds on a predetermined build support. As shown on FIG. 1, said matrix 12 may be formed by a plurality of predetermined volume elements 14 which are juxtaposed and superposed to form a plurality of superposed layers of a material onto the build support 30. Said predetermined volume elements may be layers of material or a plurality of voxels, i.e. elementary volumes of material as defined by the additive manufacturing technology: droplets of material for inkjetting, resolution of insolation in stereolithography, size of raw material in fused deposition. Hence, said matrix may comprise at least one among a plurality of layers and a plurality of voxels.

It will be noted that additive manufacturing here corresponds to a three-dimensional printing or stereolithography method, or even to a method of fused filament fabrication. Preferably, the additive manufacture is preferably one among polymer jetting and stereolithography. An advantage of polymer jetting technology is that additive manufacturing machine can have multiple printing heads with various materials.

Said matrix 12 preferably defines a three-dimensional axis system comprising a first and a second surface axes X and Y defining a surface 16 of the build support 10 as well as a thickness axis Z defining the thickness of the matrix 12. The step of determining the matrix 12 may comprises a step of selectively determining the position of each volume element 14 in the matrix 12 depending on the first and second surface axes X and Y and the thickness axis Z. Hence, the structure of the matrix 12 may be defined in three dimensions thereby allowing to define a more complex structure of the matrix 12 than known methods in which a dye is mixed in the material forming the lens. This thickness axis Z is preferably perpendicular to a surface of the build support 10, e.g. the surface 16, onto which said at least two compounds are deposited to form the matrix 12. Axes X and Y are shown on FIG. 1 for a planar structure. However, same definition applies for a curved surface.

Using additive manufacturing to manufacture said matrix determined with regard to a targeted transmission spectrum allows to provide an ophthalmic lens with at least one filtering function, even complex, that can closely fit said targeted transmission spectrum thereby improving filtering characteristics of the ophthalmic lens. Particularly, additive manufacturing allows to design the matrix structure with superposed layers, multiphase compounds, spatial gradient of filtering, porous layer or micro channeled layers. Consequently, additive manufacturing allows precise spatial control of the transmission spectrum of the obtained ophthalmic lens.

After or during the additive manufacturing step, said matrix 12 may be assembled to an optical substrate to obtain the ophthalmic lens. Alternatively, said build support 10 may be directly an optical substrate. This optical substrate, or base lens, is preferably made of a material generally used for the manufacture of ophthalmic lens, such as thermoset polymers like the allylic polymer known by the name CR39 or polythiourethane polymers known under MR Series from Mitsui. The optical substrate may also be made of thermoplastic polymers, for instance polycarbonate. Alternatively, several other optically clear polymers could be used to make functional wafers by additive manufacturing, such as: polyolefinics such as cyclo olefin polymers, polyacrylates such as polymethyl(meth)acrylate, poly(meth)acrylate, polyethyl(meth)acrylate, polybutyl(meth)acrylate, polyisobutyl(meth)acrylate, polyesters, polyamides, polysiloxanes, polyimides, polyurethanes, polythiourethanes, polyallylics, polysulfides, polyvinyls, polyarylenes, polyoxides, and polysulfones, and blends thereof.

The optical substrate may be manufactured by casting, injection, surfacing or by additive manufacturing. Furthermore, the optical substrate may have a power optical function. The optical substrate may be spherical, torical or progressive. Depending on the desired power optical function, front and back sides of the optical substrate may be each planar or curved. Said matrix 12 may cover the whole surface of the optical substrate onto which it is disposed. Alternatively, the matrix 12 covers at least partially the surface of the optical substrate.

When the matrix 12 is directly manufactured onto the optical substrate, said matrix 12 has preferably a dimension along said thickness axis Z which is lower than 50 µm. When the matrix 12 is deposited onto the build support 10 and then transferred onto the optical substrate, said matrix 12 preferably has a dimension along said thickness axis Z which is lower than or equal to 3 mm, preferably lower than or equal to 2.5 mm, most preferably lower than or equal to 2 mm.

Said matrix 12 is disposed onto the optical substrate either on a first surface intended to face an eye of a user when the ophthalmic lens is mounted on a frame (not shown) worn by the user or on a second surface opposite to the first surface. Access to front side of the optical substrate is easier but, for aesthetical or practical reasons, it should be preferred to put the matrix 12 on the back side of the optical substrate.

The matrix 12 may be formed of a plurality of superposed layers. Each layer may have a specific filtering function or participate to the at least one filtering function of the ophthalmic lens. This multi-layer configuration allows to provide the matrix with complex functionality. As an example, a fluorescent matrix 12 may be obtained with a first layer containing a LMA able to receive blue light and emit green light, a lower layer containing a LMA able to receive this green fluorescence light and emit red light. It is useful for color blindness or color amplification. Alternatively, it is possible to add a layer which aims at protecting another layer of the matrix 12. For example, an ultraviolet layer with high ultraviolet cut performance may be positioned in front of a layer containing LMAs which are highly sensitive to ultraviolet. Another function of a layer in the matrix 12 may be to stabilize a compound of another layer, as LMA (e.g. Photochromic compounds) requiring to be positioned close to a high concentration of antioxidant (such as Hindered Amine Light stabilizers, HALS) to be stable. In this case, it is possible to stack two layers including one with Photochromic compounds and the other with the HALS.

Furthermore, it is possible to select chemistry of an additive manufacturing tintable layer with better adhesion properties. In particular, when the layers deposited by additive manufacturing are protected by a hard coat (or varnish), adhesion of the hard coat is very critical. This is particularly useful because adhesion failures of hard coat layers have been observed with tinted substrates containing MR7 and MR8 polymer obtained with the known methods, in particular imbibition.

Figure 2:
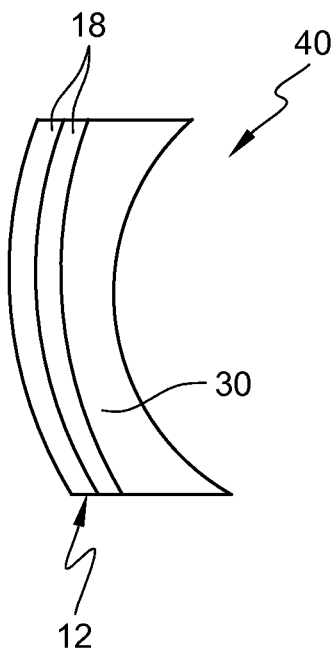
FIGS. 2 and 3 schematically show an ophthalmic lens comprising a matrix with two and five layers, respectively.

As shown on FIG. 2, the ophthalmic lens 40 may comprise a matrix 12 formed with two layers 18 superposed one on the other onto an optical substrate 30. Each layer 18 may comprise different compounds. An insulation layer may be provided between the two layers 18 to prevent surface interaction therebetween.

The flexibility provided with additive manufacturing makes it possible to determine customized filtering characteristics of the ophthalmic lens in an optician store or in online sale service. This determination may be performed from the wearer's need or from an option wanted by the wearer. In the case where the filtering characteristics are based on the transmission wanted by or relevant for the wearer, the present method allows to obtain an accurate transmission level which fits the wearer's need. Indeed, for sun lenses, only five categories are generally proposed (0-4), each category having a standard transmission range Tv. Here, the manufacturing method allows to obtain a specific transmission value Tv instead of a standard range. Alternatively, this determination may be performed based on specific wavelengths to filter. It is particularly useful when a wearer needs extra protection against ultraviolet (280-380 nm) or near infrared (780-1400 nm). In the visible range (380 nm to 780 nm), filter inhibits transmission by at least 5%, over at least one of the following ranges of wavelengths:
 a first range of wavelengths that has a width of at least 20 nm and that is centered on a mean wavelength equal to 435 nm, in order to inhibit blue-violet light,
 a second range of wavelengths that have a width of at least 20 nm and that is centered on mean wavelengths equal to 475 nm, in order to increase the red/green contrast,
 a third range of wavelengths that have a width of at least 20 nm and that is centered on mean wavelengths equal to 580 nm, in order to increase the red/green contrast,
 a fourth range of wavelengths that has a width of at least 20 nm and that is centered on a mean wavelength equal to 500 nm, in order to increase the blue/green contrast, and
 a fifth range of wavelengths that has a width of at least 20 nm and that is centered on a mean wavelength equal to 600 nm, in order to reduce the glare.

Figure 3:
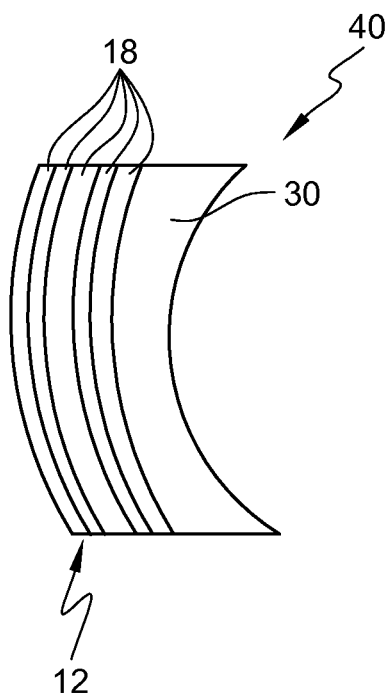

Based on the desired transmission spectrum, the number of material and the quantity of material needed may be determined to make the ophthalmic lens very close to the desired transmission spectrum. As shown on FIG. 3, said matrix 12 may comprise five different layers 18 comprising five compounds to be deposited onto the base support 10. In this example, the first compound may be a bad blue cut material $a\_M1(\lambda)$, the second compound may be a Near-infrared cut material $a\_M2(\lambda)$, and third, fourth and fifth compounds are three visible cut materials having different range $a\_M3\text{-}5(\lambda)$, wherein $a\_Mi(\lambda)$ is the absorption coefficient of the material. Transmission of each layer 18 may be determined as follows using the Beer-Lambert law for each layer, assuming that we use five layers:

$$Ti(\lambda) = \mathrm{Exp}(-a\_Mi \cdot xi)$$

wherein xi is the thickness of layer I along thickness axis Z.

The global transmission of the ophthalmic lens 40 is:

$$T(\lambda) = T1(\lambda) \cdot T2(\lambda) \cdot T3(\lambda) \cdot T4(\lambda) \cdot T5(\lambda)$$

Layer thicknesses x1 to x5 may be determined considering $T(\lambda)$ close to the wanted spectral characteristic. We thus obtain a matrix 12 with five layers 14, each layer having a specific range of wavelength cut. This provides a high flexibility in the matrix 12 design.

Furthermore, a layer 18 of the matrix 12 may be used as a mask to protect a below layer, or the optical substrate from a further process. For example, a layer 18 may be deposited by additive manufacturing on a specific area. A specific process is then performed to modify the area of the lens not covered by the layer 18. Said layer 18 may be then removed to obtain a first area modified by the specific process and a second area which is not modified by this specific process. In this regard, it is possible to obtain an ophthalmic lens with tinted and non-tinted areas.

Volume elements 14 may be distributed in the matrix 12 so that the amount of at least one of said at least two compounds varies in the matrix 12 along at least one of the first and second surface axes X and Y and the thickness axis Z. Hence, it is possible to vary the filtering characteristics of the ophthalmic lens along one or more directions of the matrix 12. Particularly, said matrix 12 may be determined to have variable transmission level along first and second surface axes X and Y. Indeed, in order to tune the power optical transmission of an ophthalmic lens, light filters could be incorporated into the bulk of the optical substrate. However, due to the center-to-edge thickness differences of the resulting lenses (in particular high plus and minus diopter powers), and the intrinsic color of the filters, the lenses could show a center-to-edge color difference, as well as inconsistent light filtration levels. Therefore, providing a variable transmission level of the matrix 12 along first and second surface axes X and Y may allow to standardize global transmission level of the ophthalmic lens. In a more general way, providing the matrix with a predetermined variable transmission level offers a great flexibility for the ophthalmic lens design.

This variation of the transmission level may be obtained by using different concentrations of light filter between the ophthalmic lens center and periphery. Additive manufacturing allows to deposit voxels on the ophthalmic lens surface having different concentrations of the light filter. The concentration of the light filters in the voxels deposited on the thicker outer part of a high minus diopter lens could be lowered (vs. the concentration in the voxels used in the center of the lens), in a way that the Absorbance of the lens is similar between center and edge. This will insure a consistent light filtration levels between the lens center and edge. This variation of concentration may be calculated using the Beer-Lambert law as follows:

$$A = \varepsilon \cdot l \cdot c$$

wherein

A is the measured absorbance $\varepsilon$ is the wavelength-dependent molar absorptivity coefficient, l is the path length, and c is the light filter concentration.

A similar method could be used to address the color difference between center and edge of a high minus diopter lens, based on the CIE76 formula as follows:

$$\Delta E = (\Delta L^2 + \Delta a^2 + \Delta b^2)^{1/2}$$

wherein
ΔE indicates the color difference,
L indicates the lightness/darkness,
a is the red/green coordinate, and
b is the yellow/blue coordinate.

The concentrations of the light filters in the edge voxels could be lowered with regard to the center voxels to achieve a $\Delta E \leq 2$ between center and edge, where the human eye could not detect a color difference.

The two above methods could be used on high plus diopter power lenses to address the center-to-edge color difference, and inconsistent light filtration levels.

Tuning of light filter concentrations described above between the center-lens voxels and the edge-lens voxels could be done in a continuous manner (gradient) from center-to-edge, allowing to achieve the same color and light filtration level at any point of the ophthalmic lens between center and edge.

Another possibility for tuning light filter concentrations is to incorporate the light filters within a wafer (or film), with consistent thickness, that will be integrated with the optical substrate to provide a homogeneous color appearance and light filtration performances. Such a functional wafer (including one or more of light blocking filters blended with a thermoplastic resin) could be made by additive manufacturing, either prior or during its integration with the optical substrate.

As a first example, the matrix 12 may be obtained with a first compound comprising a polycarbonate material containing a first light filter (such as Blue Cut) which is extruded as voxels onto the surface 16 of the build support 10. In this case, the build support 10 is an optical substrate made of polycarbonate obtained for example by standard molding techniques, such as injection molding, or by an additive manufacturing process, such as a fused deposition method. The voxels are deposited in contact with each other. This step is repeated with additional voxels to create incremental elements until the desired thickness of the three-dimensional transparent wafer is reached. Optionally, a heat source (such as microwave or infra-red) is applied to melt the voxels and remove their boundaries.

Alternatively to the first example, the voxels may be deposited to be spaced so that a second compound comprising a polycarbonate material containing a second light filter (such as Near-infrared cut) between the voxels of the first compound. Optionally, a heat source may be applied to connect the voxels of the first and second compounds.

As a second example, the matrix 12 is manufactured onto a build support 10 and then transferred to an optical substrate. In this case, the voxels may be deposited on the back side of a film or a wafer made from a material which is not compatible with polycarbonate (such as Cellulose triacetate also called TAC, or polyamide). After deposition of the voxels, a polycarbonate material is injection molded behind the layer of voxels thereby creating a connection between the injected material and the voxels, as well as between the voxels. The incompatible material is then removed.

Said at least two compounds of the matrix 12 may comprise compounds which are chemically or physically incompatible with each other. Indeed, these incompatible compounds may be placed in the matrix structure to avoid any problem of incompatibility. For example, the matrix 12 may be determined such that a barrier is formed between two consecutive layers or voxels comprising incompatible compounds, as described above in the alternative of the first example. This barrier or space may be the interface between two adjacent layers or voxels or an additional material. In this latter case, the barrier may form at least one transitional layer of compound separating two consecutive layers comprising incompatible compounds.

Alternatively or in combination, the barrier may form at least one transitional voxel disposed between two consecutive voxels comprising incompatible compounds. Furthermore, the barrier may be form as a gap or space forming a void between two consecutive layers or voxels. This gap or space may be later filled with a coloring hardenable solution.

The gap or space between the deposited voxels could be filled with a lower molecular weight and lower melting point polycarbonate than the one used to make the first deposited voxels. In this case, the light filters are better dispersed in lower molecular weight species that could easily be melted to connect the voxels.

The gap or space may be alternatively filled with a powder of the same polymer used to make the first deposited voxels, that is mixed with the light filter (in the solid state). In this case, the light filter is easily dispersed. Furthermore, heat treatments are critical for heat sensitive light filters such as blue cut filters and photochromic filter. In the present case, the number of heat treatment are reduced, resulting in a better efficiency of the light filters. This method may be even more efficient if the polymer used in the powder has a lower molecular weight than the polymer used to make the first deposited voxels, because it will be easier to melt the voxels with each other.

The gap or space may be alternatively filled with different polymers than the one used to make the first deposited voxels to ease dispersion of the light filters in the first deposited voxels. The refractive index difference between the two polymers is preferably lower than 0.02.

The gap or space may be alternatively filled with an adhesive (liquid or solid) which may be used to both connect the voxels with each other and integrate the wafer to the ophthalmic lens 40.

The wafer or film obtained by additive manufacturing, could be further thermoformed to reach a geometry that is compatible with the ophthalmic lens geometry prior to its integration with the optical substrate.

When the matrix 12 is manufactured as a wafer, said matrix 12 has a dimension along said thickness axis which is lower than or equal to 3 mm, preferably lower than or equal to 2.5 mm, most preferably lower than or equal to 2 mm. It is also preferred that maximum and minimum thicknesses in a same matrix 12 is within 50%, preferably within 20%, of a nominal thickness to homogenize color appearance and the light filtering performance level of the wafer.

When limitation occurs in the dye mixtures due to chemical incompatibilities, additive manufacturing enables a partition between the compounds, building the matrix 12 by stacking different layers or voxels where the incompatible dyes are placed in different layers or voxels of the stack. Despite this physical separation of the dyes in various layers of the matrix 12, the resulting transmission spectrum is similar to the transmission spectrum of a substrate where all dyes would have been mixed in the same matrix 12.

Compared to a classical ink-jet process, the layer thickness of the matrix 12 are much thicker ($50 < t < 200$ μm) because the layers are part of the lens building blocks. This is an advantage because it allows reducing the concentration of dyes or pigments in the formulation. This reduced concentration allows more flexibility in the formulation of the resin, without facing challenges around solubility limits. This reduced concentration is compensated by a greater thickness. It can be considered that depending on 1) the limit of solubility of the dyes or pigments, 2) the targeted overall thickness of the lens, the thickness of each building block is calculated and optimized to reach the best balance between both parameters. This cannot be achieved by classical ink-jet process where the colored layer is not a building block of the ophthalmic lens.

Nanopigments may be used to participate to the filtering function of the matrix 12. In this case, ultraviolet-curing process associated with additive manufacturing allows to limit the aggregation phase of the nanopigment due to a fast hardening of the matrix 12. Furthermore, nanopigments generally require specific dispersing or stabilizing agents that may be detrimental to mold/polymer interface, resulting in demolding. Additive manufacturing allows to introduce and physically position these materials, without impairing the whole bulk substrate. In addition, nanopigments presenting better light fastness are preferably used because they are less sensitive to ultraviolet-curing process compared to classical organic dyes.

Furthermore, it is possible to combine additive manufacturing additives or LMA having chemical or functional incompatibility with each other or with a monomer/polymer, or with a catalyst/initiator by separating these compounds. For example, monomer droplets forming the majority of the optical substrate may contain a first initiator whereas the droplets containing "sensitive" additives are polymerized with a second initiator softer than the first initiator. Alternatively, orga-cationic dyes and orga-anionic dyes may be deposited with different droplets avoiding ion pairing phenomenon and associated precipitate. Alternatively, some transition metallic complexes used as visible or Near-infrared dyes may contain metallic species favorable to speed up the free radical reaction and so would not be suitable for a bulk polymerization for safety issues.

In other embodiments, photochromic LMAs require a lower reticulation level than other substrate so that photochromic compounds may rearrange spatially inside the material. For example, CR39 and MR8 polymers have to be modified with "spacer monomers" to be compatible with hydrodynamic volumes of Photochromics LMAs, but these "spacer monomers" degrade mechanical properties of the substrate. To overcome this issue, the photo-chromic species could be incorporated into the substrate via dedicated monomer droplets different from the other droplets of monomer that would be the main component of the substrate. In this way, a good compatibility between Photochromic LMAs and the monomer is obtained thereby avoiding the degradation of substrates mechanical properties.

Furthermore, when the optical substrate is additively manufactured some non-polymer material may be deposited and enclosed in the bulk material. This process using multiphase compounds allows bringing functionality that normally requires liquid phase, or functionality that are much more efficient in liquid phase, like photochromism (quicker rearrangement in liquid than in solid material) or LMAs that would not be dispersed in solid material.

Microfluidics may also be used to manage incompatibility compounds. In this case, micro-canals are created when the optical substrate is additively manufactured to benefit from functionality based on microfluidics. A switch on the frame allows to send the fluid inside or to remove the fluid from the ophthalmic lens in order to activate or not the expected functionality (LMA, temperature, anti-fog, etc). Color of the ophthalmic lens may be changed depending on the fluid sent in the lens or simply creating an On/Off effect. The transition between colored lens and clear lens is faster than current photochromic molecules.

Figure 4:
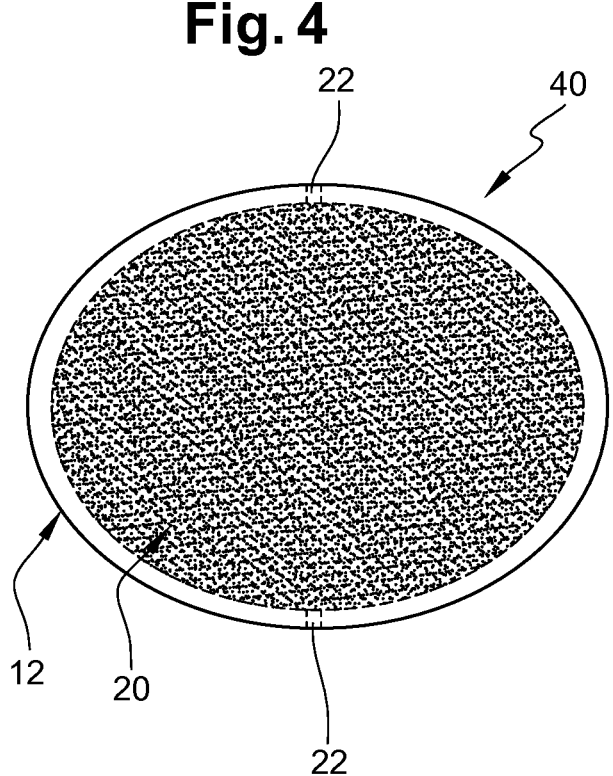
FIGS. 4 and 5 show a front view and a cross-section of an ophthalmic lens comprising a matrix with an internal cavity filled with a liquid compound.
Figure 5:
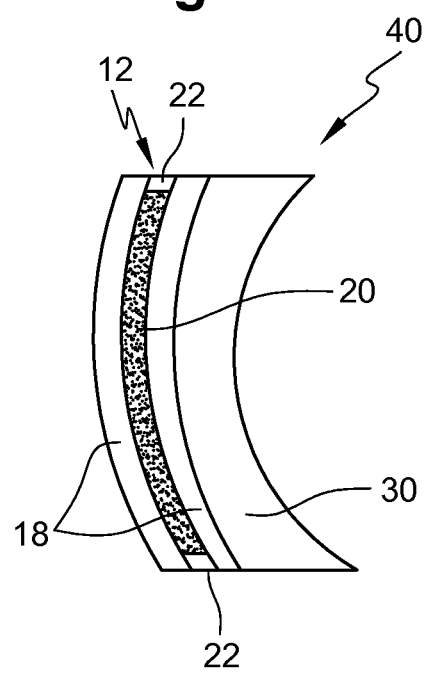

FIGS. 4 and 5 shows an example of the ophthalmic lens 40 with multi-cavities formed in the matrix 12. An internal cavity 20 is formed inside the matrix 12 and is provided with inlets 22. The internal cavity 20 may be filled with a compound in liquid phase through the inlets 22. Layers 18 surrounding the internal cavity 20 are made of a compound in solid state, e.g. deposited with additive manufacturing. The compound in liquid phase may also be deposited using additive manufacturing or using capillarity.

Moreover, it is possible to control the orientation of the LMA or additive during additive manufacturing using an external trigger such as a magnetic field or an electric field. This is particularly efficient for dichroic, liquid crystalline (nematic or cholesteric in particular) and magnetic polar nanoparticules. In such cases, LMAs will be located in the matrix with a specific orientation, associated to their performance.

Consequently, the present manufacturing method provides a method using at least two different compounds in separated layers or voxels for building a global layer, or matrix 12. This combination of at least two different compounds may be configured to manage incompatibility between monomer, polymer, dye and initiators, to create customized filter with a limited set of material dyes compatible with additive manufacturing, to create a multiphase layer, to facilitate optional polishing step of the ophthalmic lens surface, to facilitate HMC adhesion or a combination thereof.

Furthermore, the manufacturing method may comprise a step of polishing the matrix 12 after deposition of the predetermined volumes 14 on the build support 10. In this case, said matrix 12 is preferably determined to be oversized along the thickness axis Z and/or to comprise a peripheral layer having a transmission being higher than the transmission of a matrix area located between said peripheral layer and the build support. The matrix 12 preferably comprises a transparent compound that is disposed at the periphery of the ophthalmic lens 40 along the thickness axis Z so that a portion of this transparent compound may be removed without affecting the filtering function. In this case, the layer having spectral characteristics is preferably embedded between the transparent layer and the optical substrate 30 to keep the filtering function unchanged. Alternatively, the matrix 12 may be determined so that the filtering function is reached even when a portion is removed during the polishing step.

Steps of determining said transmission spectrum and said matrix 12 preferably form a computer implemented method. In this case, the step of determining said matrix comprises a step of providing a data base comprising a plurality of compounds, a step of allocating a label to each compound in the data base, and a step of selecting said at least two compounds in the data base depending on said allocated labels and the position of volume elements of said at least compounds so that said matrix has the determined transmission spectrum.

The invention claimed is:
1. A method of manufacturing an ophthalmic lens having at least one filtering function, the method comprising:
 determining a transmission spectrum in a wavelength range from 280 to 2000 nm;

determining a matrix comprising, in separated layers or voxels, a first compound and a second compound absorbing light having a wavelength from 280 to 2000 nm, with regard to the determined transmission spectrum; and additively manufacturing said matrix by depositing a plurality of predetermined volume elements of said compounds on a predetermined build support, wherein the first and second compounds comprise compounds that are chosen among:
- (i) a first initiator of polymerization comprised in the first compound and a second initiator comprised in the second compound, the second compound comprising an additive, said additive being chemically sensitive to said first initiator,
- (ii) an organic cationic dye comprised in the first compound and an organic anionic dye comprised in the second compound additive,
- (iii) a transition metallic complex used as a visible or near-infrared dye in the first compound and a monomer in the second compound, the transition metallic complex containing metallic species configured to speed up free radical polymerization of said monomer, and
- (iv) a photochromic light management additive comprised in the first compound and a polymer comprised in the second compound, the polymer comprised in the second compound having a reticulation level preventing said photochromic light management additive from spatially rearranging when the photochromic light management additive is dispersed inside said polymer.

2. The method according to claim 1, wherein said matrix comprises at least one among a plurality of layers and a plurality of voxels.

3. The method according to claim 1, wherein the matrix defines a three-dimensional axis system comprising:
first and second surface axes defining a surface of the build support, and
a thickness axis defining the thickness of the matrix,
wherein said determining the matrix comprises selectively determining the position of each of the volume elements in the matrix depending on the first and second surface axes and the thickness axis.

4. The method according to claim 3, wherein the thickness axis is perpendicular to a surface of the build support onto which said compounds are deposited.

5. The method according to claim 3, wherein the volume elements are distributed in the matrix so that the amount of at least one of said at least two compounds varies in the matrix along at least one of the first and second surface axes and the thickness axis.

6. The method according to claim 1, wherein said at least two compounds comprise at least one dye.

7. The method according to claim 1, wherein the matrix is determined such that a barrier is formed between two consecutive layers or voxels comprising incompatible compounds.

8. The method according to claim 7, wherein the barrier is formed by one of:
at least one transitional layer of compound separating two consecutive layers comprising incompatible compounds, and
at least one transitional voxel disposed between two consecutive voxels comprising incompatible compounds.

9. The method according to claim 1, wherein the build support is an optical substrate.

10. The method according to claim 1, further comprising assembling said matrix to an optical substrate to obtain the ophthalmic lens.

11. The method according to claim 1, wherein the additively manufacturing to manufacture said matrix comprises one of polymer jetting and stereolithography.

12. The method according to claim 2, further comprising polishing the matrix,
wherein said matrix is one or more of: (i) determined to be oversized along the thickness axis (ii) determined to comprise a peripheral layer having a transmission higher than a transmission of a matrix area located between said peripheral layer and the build support.

13. The method according to claim 1, wherein the determining said transmission spectrum and the determining said matrix form a computer-implemented method, the determining said matrix comprising:
providing a database comprising a plurality of compounds,
allocating a label to each compound in the database, and
selecting said at least two compounds in the database depending on said allocated labels and the position of volume elements of said at least compounds so that said matrix has the determined transmission spectrum.

14. An ophthalmic lens having at least one optical function, the ophthalmic lens being obtained by the manufacturing method according to claim 1, the ophthalmic lens comprising:
an optical substrate;
the determined matrix onto a surface of the optical substrate, said determined matrix providing the spectrum transmission in the wavelength range from 280 to 2000 nm to the ophthalmic lens, said matrix comprising the at least two compounds absorbing light having a wavelength from 280 to 2000 nm,
wherein said determined matrix is obtained by additive manufacturing by depositing the plurality of predetermined volume elements of said compounds on the predetermined build support.

15. The method according to claim 2, wherein the matrix defines a three-dimensional axis system comprising:
first and second surface axes defining a surface of the build support, and
a thickness axis defining the thickness of the matrix,
wherein said determining the matrix comprises selectively determining the position of each of the volume elements in the matrix depending on the first and second surface axes and the thickness axis.

16. The method according to claim 4, wherein the volume elements are distributed in the matrix so that the amount of at least one of said at least two compounds varies in the matrix along at least one of the first and second surface axes and the thickness axis.

17. The method according to claim 2, wherein said at least two compounds comprise at least one dye.

18. The method according to claim 3, wherein said at least two compounds comprise at least one dye.

19. The method according to claim 4, wherein said at least two compounds comprise at least one dye.

* * * * *